United States Patent [19]

Norrie

[11] Patent Number: 5,142,971
[45] Date of Patent: Sep. 1, 1992

[54] APPARATUS FOR INJECTING SUSPENDED MEAT SOLIDS INTO MEATS

[75] Inventor: Lyle W. Norrie, Etobicoke, Canada

[73] Assignee: Knud Simonsen Industries Limited, Rexdale, Canada

[21] Appl. No.: 583,205

[22] Filed: Sep. 17, 1990

[51] Int. Cl.[5] .................. A22C 17/00; A23B 4/00; A23L 1/31
[52] U.S. Cl. .................................. 99/487; 99/533
[58] Field of Search ............... 99/487, 516, 532-535; 426/281, 652; 17/25, 51

[56] References Cited

U.S. PATENT DOCUMENTS

| | | | |
|---|---|---|---|
| 3,246,595 | 4/1966 | Wharton et al. | 99/487 |
| 3,273,487 | 9/1966 | Schleanitzauer | 99/487 |
| 3,656,424 | 4/1972 | Evanson | 99/487 |
| 3,863,556 | 2/1975 | Townsend | 99/533 |
| 3,922,357 | 11/1975 | Townsend | 426/281 |
| 4,254,151 | 3/1981 | Townsend | 17/51 |
| 4,286,510 | 9/1981 | Prosenbauer | 99/535 |
| 4,311,071 | 5/1982 | Niccolls | 99/532 |
| 4,455,928 | 6/1984 | Townsend | 99/535 |
| 4,622,892 | 11/1986 | Corominas | 99/533 |
| 4,960,599 | 10/1990 | Cozzini et al. | 426/652 |

Primary Examiner—Timothy F. Simone

[57] ABSTRACT

Apparatus for the injection into meat sections of a cold milled particle reduction suspension of finely divided meat pieces in a liquid mixture, and having pump means on a container for pumping the suspension from the container at a constant pressure of a set point between about 30 and about 90 psi, to a plurality of injection needles, a support for supporting at least one meat section in registration with the injection needles; a movement device for reciprocating the needles towards, into, and away from the meat sections, smoothly curved conduits connecting from the needles, and, valves for opening and closing all the conduits simultaneously, the valves being normally closed prior to insertion, and being all openable simultaneously when at least some of the needles enter the meat sections, the pump being operable to pump the suspension of meat pieces through all the valves and all the injection needles at the pre-set pressure, whether the needles are located in a meat section or not, and thereby ejecting suspension from all the needles simultaneously, and a method of injecting meat sections using the apparatus.

8 Claims, 6 Drawing Sheets

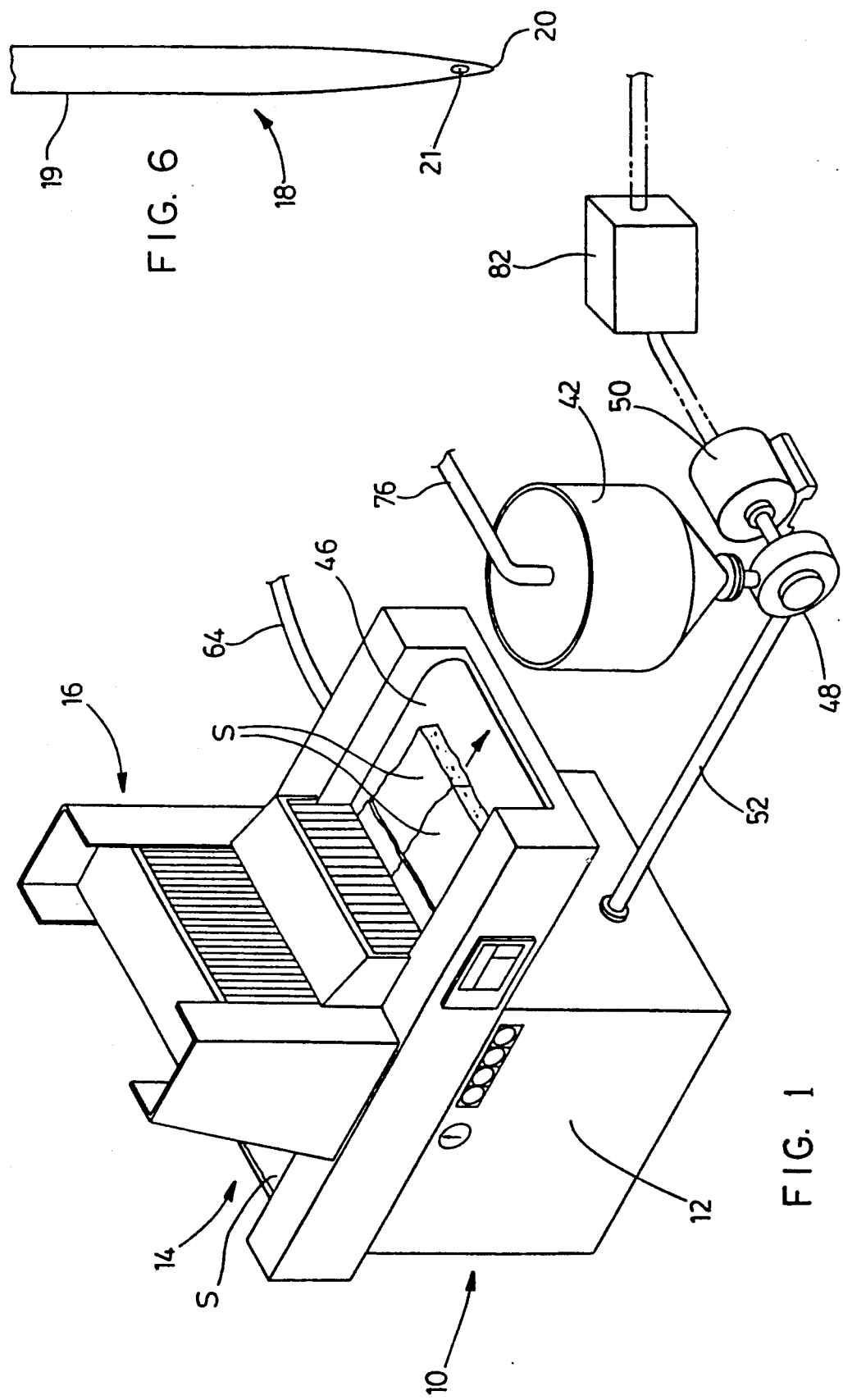

APPARATUS FOR INJECTING SUSPENDED MEAT SOLIDS INTO MEATS

FIELD OF THE INVENTION

The invention relates to the injection into "flesh" sections of flesh foods of a suspension of flesh solids in a liquid, and in particular to an apparatus for the injection of such a suspension and a method of injection of such a suspension.

BACKGROUND OF THE INVENTION

The processing of various flesh products, including meat and fish, involves the injection of mixtures and solutions, such as salt brine, and pickle for preserving, flavouring and curing such products. Typical such products include hams, picnics, bacon, shoulders, briskets, and any other products which may be injected with liquids from time to time. Such products may be pork, beef, poultry, or, for example, fish products, which are being further processed after dressing, cleaning, and chilling. All such injectable products are termed herein as "meat" whether the same includes any type of meat or poultry or fish.

The process of injection involves the insertion of a plurality of elongated injection needles into a meat section, after which the liquid is pumped into the meat. It is well known that this process leaves markings in the meat if the diameter of the needles is large and their spacing and orientation is regular, and when the meats are sliced for consumption, these markings appear as visible blemishes.

It is also known in the meat processing industry that in order to make use of the trim portions of lean meat, such trim portions may be finely ground and emulsified with a liquid. The emulsion is then used for making sausage products such as hot dogs, bologna, weiners, frankfurters, and the like.

In an attempt to alleviate the problem of markings and blemishes in meat sections resulting from the pickle or brine injecting process, it has been proposed to make a mixture of such a meat emulsion, similar to that used in sausage products, with a pickle or brine, and to inject this mixture into the meat sections. This proposal has not been entirely successful, and injection marks and blemishes are still visible.

Meat emulsions are in the form of a smooth cream in texture, in which the meat particles are so fine that it is impossible to distinguish them. By definition, the fine meat particles form a continuous phase in this mixture encapsulating the fat and moisture in the matrix of soluble protein derived from the meat. When injected into meat sections, i.e., muscle meat, the emulsion will still have the texture and appearance of a paste, and is easily detected with the naked eye when the product is sliced for consumption, so that the problem of blemishes is still present.

It has now been established that if, in place of the meat emulsion, a mass of finely divided meat pieces (i.e., less than 2.0 mm in length) is suspended in the pickle or brine where the aqueous phase is continuous, and the meat particles are held in suspension within this aqueous phase, this suspension can be injected into the meat sections in accordance with the process and apparatus disclosed herein. When such meat sections are so injected, and processed for consumption and sliced, needle marks or blemishes are no longer visible, and cannot be discerned by the naked eye. Consequently they do not impair the appearance of the meat when it is consumed.

An additional benefit of this process lies in the fact that, while the injection of brine or pickle mixtures assists in the curing of the meat sections, and the flavouring of the meat sections, it essentially "dilutes" the actual weight of the meat section. In other words, while a meat section weighing, for example 1000 grams, without injection of brine or pickle, and represents to the consumer as a buyer at that stage 1000 grams of meat, a section of 1000 grams to which, for example 300 grams (i.e., 30%) of brine or pickle mixture has been injected, has a total weight of 1300 grams, but still represents to the processor purchased meat of only 1000 grams. Consequently, when the consumer purchases a given quantity of meat products processed with pickle or brine, at for example an injection rate of 30%, the consumer is in fact receiving original muscle meat of approximately $1000/1300 \times 100 = 76.9\%$ of the total weight purchased.

This factor is, of course, well understood in the industry, and in fact is carefully regulated by industry practice and government regulations. When, however, such meat sections are injected with finely divided meat pieces, suspended in the pickle or brine mixture, then the consumer is in fact receiving muscle meat, additional to that contained in the actual meat section which is injected. Thus the consumer is in effect receiving more value for money, in addition to receiving a product which is more visually appealing when sliced and consumed, than a product which is injected simply with the usual liquid mixture of pickle or brine.

This factor is advantageous to the processor for two reasons. In the first place, the public will perceive the product as being more desirable than a product injected in the conventional way with liquid brine, and will thus tend to purchase the improved product rather than the unimproved product. In addition, however, there is a further advantage to the processor, namely, that under the old practice where the meat trimmings were ground and emulsified for making sausage products, they resulted in a lower price being obtained for the product. However, by the use of the invention, where such meat trimmings are finely divided and are then incorporated in an injected product, then they will be fetching a somewhat higher price, and consequently the process will have economic value to the processor beyond the factor of simply making the product more appealing. Such a suspension is defined herein as a "cold milled particle reduction suspension", and in such suspension the particles are less than 2.00 mm in any dimension.

Attempts to carry out this process using conventional injection needles and pumps, designed for injecting conventional liquid pickle or brine mixtures have been unsatisfactory. Conventional injection equipment consists simply of a plurality of needles mounted on a moveable framework, which could be operated automatically to repeatedly plunge the needles into the meat sections, while the meat sections were moved progressively in step-wise fashion past the needles. In addition, such conventional equipment included a tank for holding the brine, and a pump. However, it is found that when using this relatively simple equipment to inject a suspension of meat pieces, the nature of the suspension of meat pieces undergoes an irreversible change due to temperature rise. As a result, the suspension turns into a jelly-like mass, in which condition it is impossible to handle, and it is impossible to inject it, into meat sections.

In addition, conventional injection needles employ a design in which the end of the needle is pointed, for ease of insertion, and in which a central passageway down the interior of the needle, terminates in an opening adjacent one side of the needle (i.e., the needle discharge port is radial drilled).

It is found that these needles are unsuitable for the injection process, when operating with a suspension of meat pieces.

A further problem was encountered using conventional equipment in that the suspension of meat pieces was found to be unsuitable for pumping through conventional equipment, and modifications were required before the suspension could be pumped satisfactorily at a constant pressure.

A further feature arising from the nature of the suspension was found to arise from the fact that the suspension has a much greater resistance to flow along a conduit than does a liquid pickle or brine, and the conduits, especially the smaller diameter conduits leading to the injection needle, on conventional equipment were found to create too much resistance to flow. In addition, conventional equipment would become plugged with such suspension, and had to be repeatedly cleared out to ensure free flow.

It is also found in practice that there is some degree of wastage in the injection of the suspension, which will then cause loss to the process. Using conventional equipment this wastage could not be recovered.

It has also been established that even with the equipment designed for optimum performance, the steps of injection were preferably carried out in a certain manner and at a certain temperature range in order to achieve maximum efficiency.

BRIEF SUMMARY OF THE INVENTION

With a view to overcoming the various disadvantages of the process noted above, the invention comprises apparatus for the injection of a cold milled particle reduction suspension of finely divided meat pieces (less than 2.0 mm in any dimension) in a liquid mixture, and comprising container means for receiving a supply of said suspension, pump means on said container means for pumping said suspension from said container means at a constant pressure of a set point of between about 30 and about 90 psi, to header means, a plurality of injection needles connected to said header means, said injection needles defining axial passageways and openings at their free ends, and defining points, on respective said needles, smoothly curved conduit means connecting from said header means, to said passageways in said needles, and, valve means on said header means for opening and closing all said conduit means simultaneously, said valve means being normally closed prior to insertion and all being openable simultaneously when at least some said needles enter said meat section, said pump means being operable to pump said suspension of meat pieces through all said valve means and all said injection needles at said pre-set pressure of between about 30 and about 90 psi, and at a temperature of between about 26° F. and 42° F., whether said needles are located in a said meat section or not, and thereby ejecting said suspension from all said needles simultaneously.

The invention further provides apparatus as described, and further including collector means for collecting excess suspension from around said meat section, and an apparatus for returning same to said container for injection into a further said meat section.

The invention further provides apparatus as described and further including heat exchanger means for chilling said excess suspension to a temperature of between 26° F. and 36° F.

The invention further provides an apparatus having the foregoing features and including means for detecting the position of said needles, the depth of injection into the meat sections, the pressure of said suspension during injection, and means for varying the operation of said pump means, and means for detecting the temperature of said suspension, whereby to maintain control over said temperature and pressure of said suspension.

The invention also provides a method of injecting meat sections with a suspension of finely divided meat particles by means of apparatus described above, while maintaining predetermined temperature ranges, and percentages of suspension.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a schematic perspective showing a typical pickle injection apparatus;

FIG. 6 is an enlarged perspective of a portion of an injection needle;

DESCRIPTION OF A SPECIFIC EMBODIMENT

In conventional pickle-injecting machines, injection needles are forced into a section of meat, while a pump is operated to force the liquid brine or pickle through the injector needles into the meat section.

The injector needles in the conventional type of equipment consist of elongated tubular needles, having a solid point at the end, and having an ejection opening formed or drilled in one side of the needle, close to the end. In this way, the needle has a sharp solid point which can be readily forced into the meat section.

The injection machine has power means, e.g., hydraulic means for operating the needles, and a pump for pumping the liquid. A tank alongside the machine supplies the liquid.

In most meat processing plants, the various steps of dressing the meat, and cutting it into cuts, and then removing the muscle meat or lean meat for the formation of meat sections to be made into hams, for example, or the removal of other meat sections such as separating the brisket from the remainder of the carcass, result in almost all cases in the creation of small cuttings or trimmings of relatively lean meat. In most meat processing facilities, such cuttings or trimmings are then utilized in the production of other low value-added meat products such as sausages. In many cases, such cuttings or trimmings are passed through a meat grinder, and ground up as finely as possible and mixed with a liquid to produce a meat emulsion, which is used in the production of sausage products such as hot dogs, weiners, and bologna.

In accordance with the present invention, however, such lean meat cuttings and trimmings will be processed cold in a cold reduction mill with an aqueous pickle or brine solution of from two to six times the weight of said trimmings so as to shred and divide the lean meat into finely divided meat pieces, wherein the meat texture and fibre is still identifiable to the naked eye. The meat pieces should be no larger than 2 mm in any direction. These meat pieces will then form a suspension in such pickle or brine. The temperature of the suspension formed should be chilled or maintained at a temperature between about 20° F. to 26° F. prior to further use. It is then transferred to a tank or container for injection through the injection apparatus into the meat sections.

Figure 5:
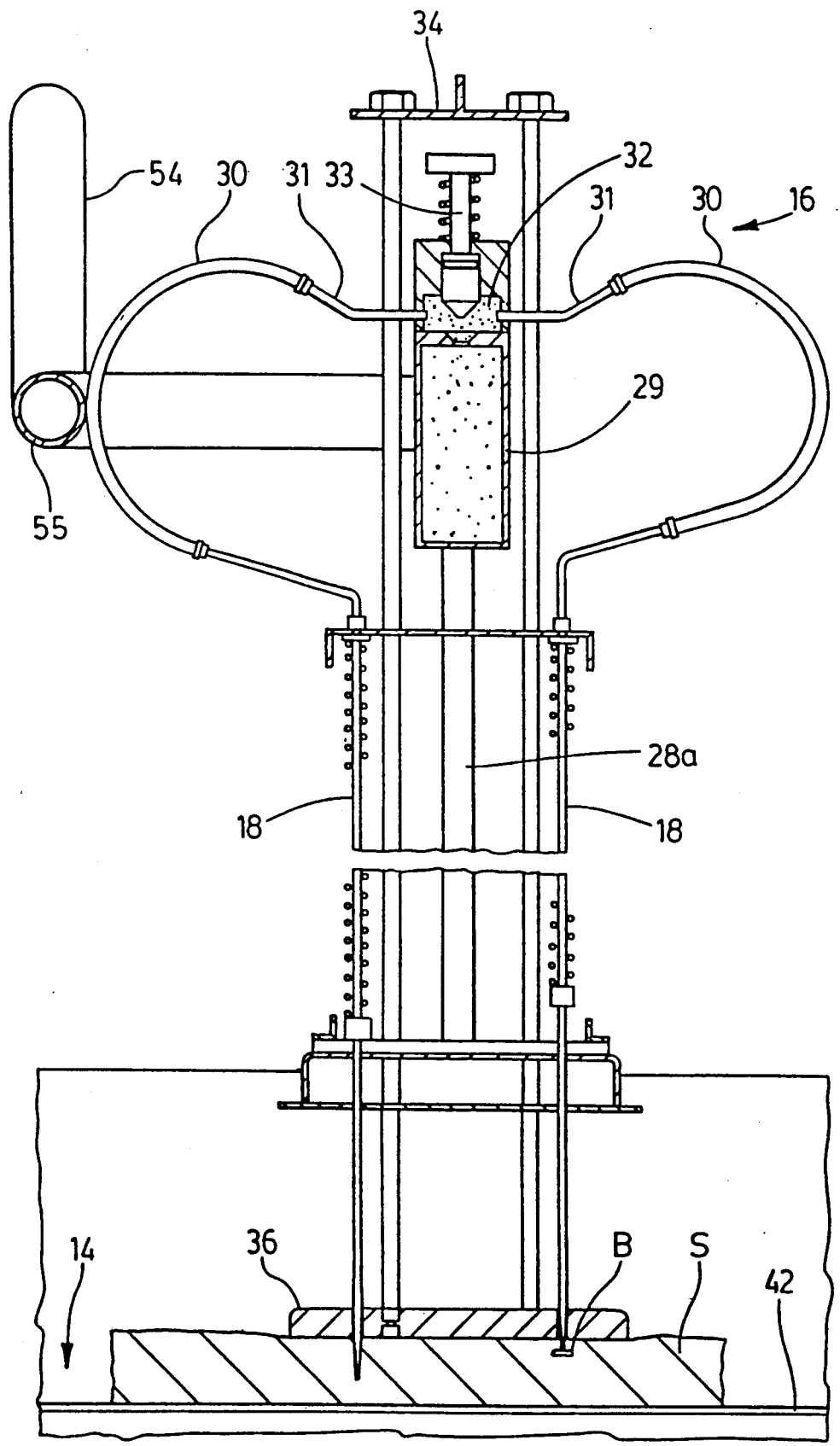
FIG. 5 is an enlarged section along 5—5 of the injection portion of the apparatus of FIG. 4.

In accordance with the invention, the invention provides a pickle injector unit indicated generally as 10, having a main body portion 12, and a conveyor portion 14, and an injector head 16. A plurality of needles 18 are mounted in the injector head 16, and are described in more detail in connection with FIG. 5. As shown in FIG. 6, in accordance with the invention, the injection needles consist of a tubular body 19, defining an axial passageway formed with an end portion defining an offset point 20 to one side of said body, and a planar angled oval perimeter 21, and an axial opening across the full extent of the cross-section of said needle.

Needles 18 are mounted between an upper cross-frame 22 and a lower cross-frame 22A, moveable with respect to upper cross-frame 22. Springs 23 are provided for needles 18, so that they may be moved against the influence of the springs relative to the lower cross-frame 22A by the upper cross-frame 22. The upper cross-frame 22 is, in turn, connected to side rods 24. Rods 24 are connected by a cross-frame 26 to a cylinder 28. The operation of cylinder 28 will thus cause the needles 18 to move downwardly and upwardly.

The injector needles are supplied with suspension by a transverse header tube 29.

In accordance with a feature of the invention, individual semi-flexible hoses 30, extend between nipples 31 on the header tube and the upper ends of the needles. The hoses 30 are formed into smoothly regularly radiussed curves, so as to provide a unobstructed flow path for the suspension.

A plurality of valves 32 are provided in the header, there being one such valve for each set of two nipples or needles. The valves are normally closed, and have spring-loaded stems 33 operable by a valve operating bar 34 which, in turn, is open in unison with the action of the stripper plate 36

In order to permit the needles to be withdrawn from the meat pieces, the moveable stripper plate 36 is provided. The stripper plate 36 has a plurality of holes 38 therethrough for receiving the needles. The stripper plate is moveable downwardly by means of cylinder 28. The stripper plate 36 is moveable upwardly by power-operated means such as cylinders 40 which are connected to shafts 41. Cylinders 40, on their upward stroke, also function to close the valves 32, in a manner explained below.

Cylinders 40 are essentially inoperative, but closed, on the downstroke of cylinder 28. In this way, both the needles and the stripper plate descend in unison, with valves 32 closed by bar 34. As the stripper plate engages a meat section it stops. Cylinders 40 then open, permitting the needles to descend further into the meat section. This causes the header 29 to move downwardly relative to bar 34, thus opening all of the valves 32 in unison. This permits the pump to pump the suspension through all of the valves 32, and all of the needles 18, into the meat sections.

After pumping, the cylinder 28 is operated to raise header 29 thus withdrawing the needles from the meat section. However, during this stage cylinders 40 are operated to hold the stripper plate down.

In this way, the meat section may be held firmly by the stripper plate, while the needles are removed.

Bar 34 remains stationary, as header 29 is raised. Thus valves 32 are closed as the needles are withdrawn. It will be understood that in fact several meat sections will be placed on the conveyor at a time so that as many needles as possible register with and discharge suspension into the meat section.

It is however recognized that, and is a significant feature of the invention, in many cases not all of the needles will register with meat sections, and will thus simply be open at their ends. Other needles may engage or encounter pieces of bone in the meat sections and thus be unable to penetrate further, so that they are at least partially open at their ends.

However, in accordance with the invention, the suspension is pumped through all such needles in each stroke and in each cycle simultaneously, and any suspension which is simply discharged exteriorly of meat sections will be collected and recycled in a manner described below.

This significant feature of the invention enables the injection apparatus to pump and inject the suspension in a reliable and repeatable fashion, without jamming or plugging of needles or their conduits.

In order to advance the muscle meat sections progressively to register with the needles along conveyor portion 14, a moveable conveyor belt 42 is provided, consisting of an open mesh chain or screen, which may be moved intermittently, by any suitable motor means 44 such is well known in the art, in a start-stop fashion so as to progressively move sections of muscle meat to register with the needles.

Figure 4:
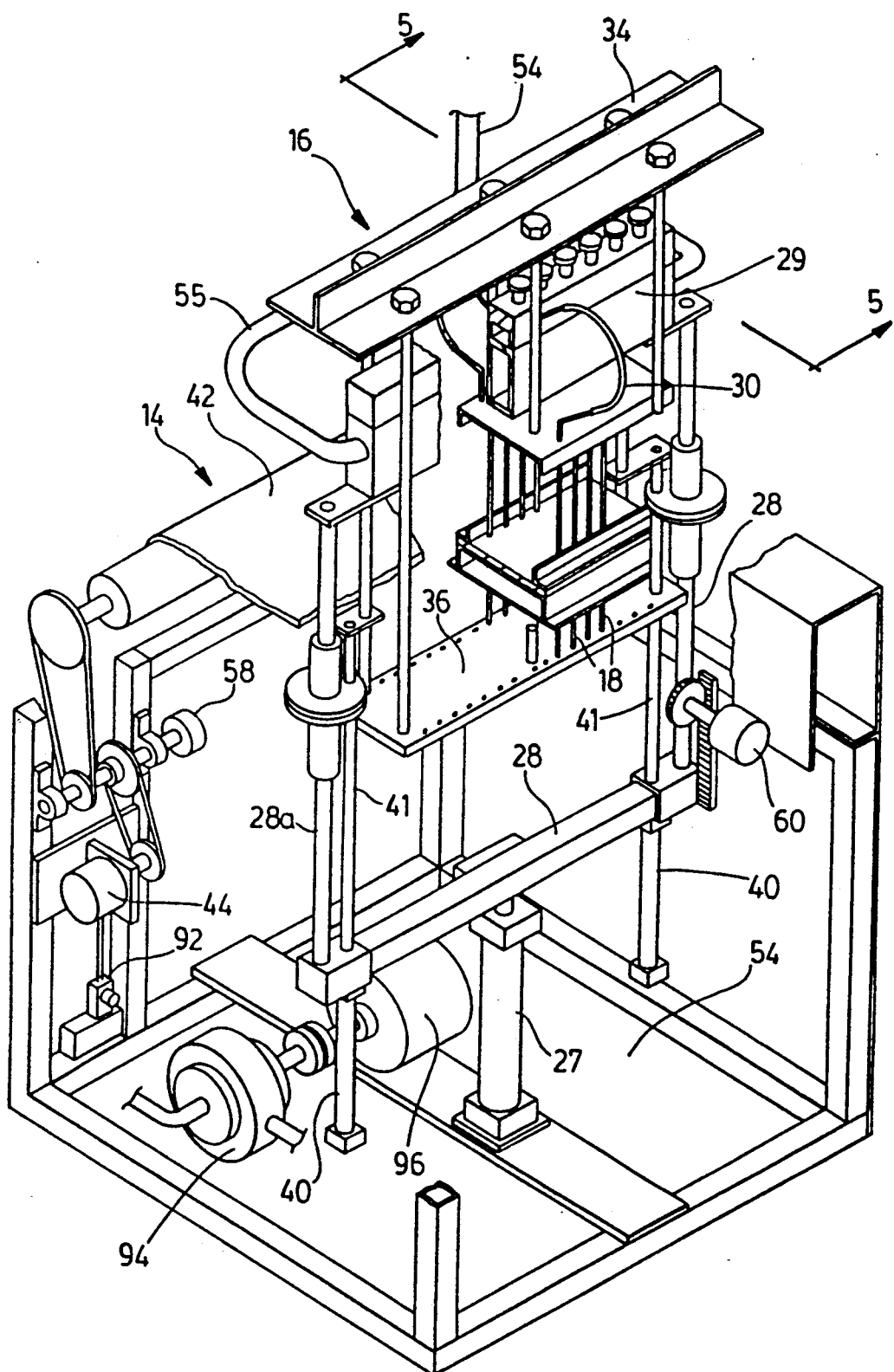
FIG. 4 is a fragmentary perspective illustration of the apparatus of FIGS. 2 and 3, partially cut away.

In order to supply the suspension of finely divided meat pieces in brine or pickle, a supply tank 46 is located exteriorly of main body 12, and is provided with its own variable speed pump 48 driven by motor 50. A fixed conduit 52 connects with the main body 12, and from within the main body 12 (FIG. 4) a flexible conduit 54 extends upwardly through branch tubes 55 which connect to the header tube 29, at each end.

In this embodiment, motor 50 is a variable speed motor, and can be operated so as to control the speed of pump 48, and thus to regulate the pressure of the suspension within the conduits 52 and 54.

A pressure transducer 56 is provided, connected, for example, to conduit 54, whereby to constantly monitor the pressure of the suspension and to provide feedback for the control motor 50.

In addition, a belt advance encoder 58 (FIG. 4) is connected to the motor 44 of the conveyor belt 42 whereby to determine the position of the conveyor belt.

In order to determine the position of the injector head 16, a positional encoder 60 is provided, engaging frame 28.

Figure 7:
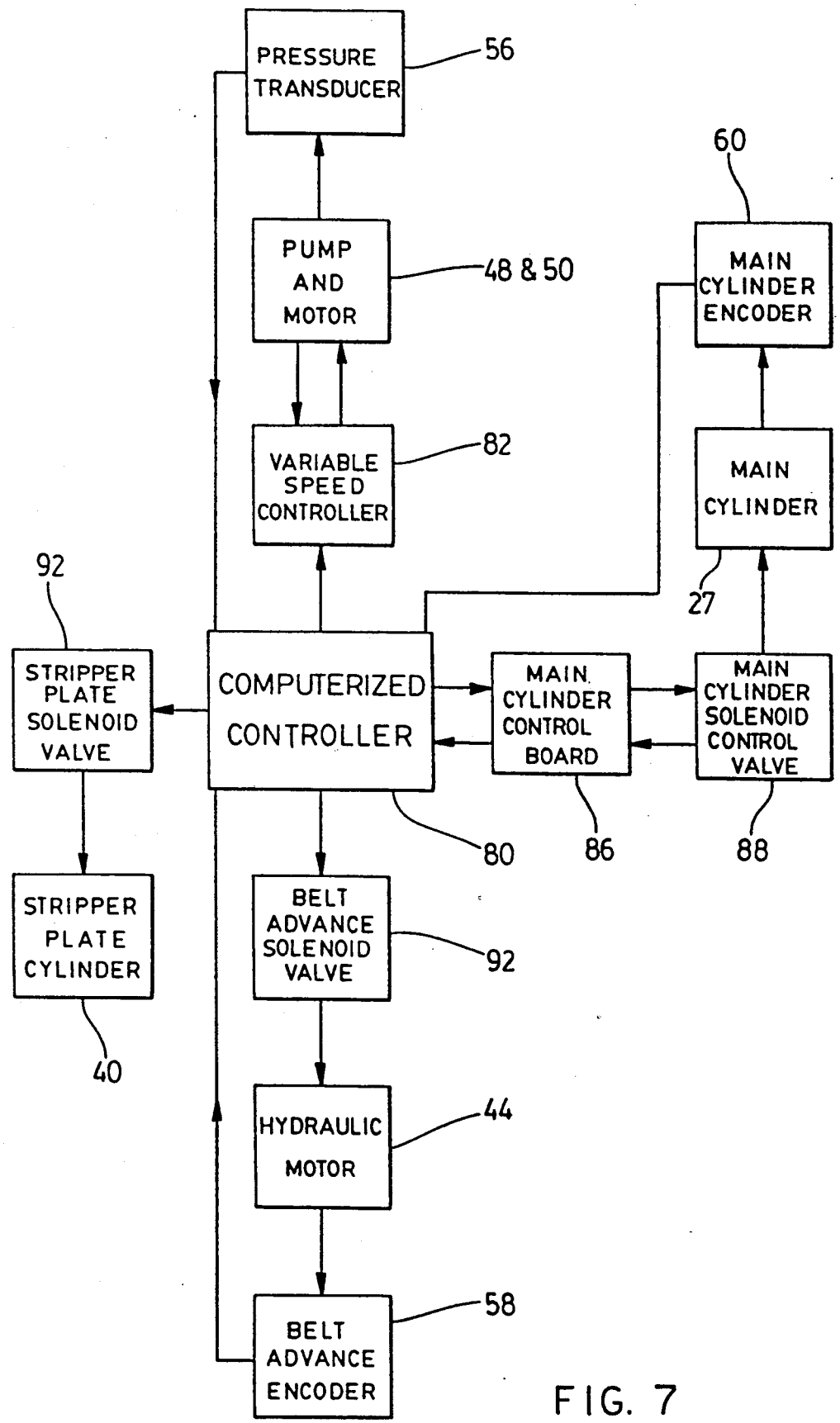
FIG. 7 is a schematic block diagram showing the controls of the principal components of the apparatus, and, FIG. 8 is a schematic diagram of a system incorporating the pickle injecting apparatus.

Suitable control valves (not shown) are provided for the motor 50, motor 44, cylinder 27, and cylinders 40, whereby their operation can be controlled. Such control valves are well known in the art and are omitted from this illustration and description for the sake of clarity. They are referred to generally in the block diagram of FIG. 7.

Figure 3:
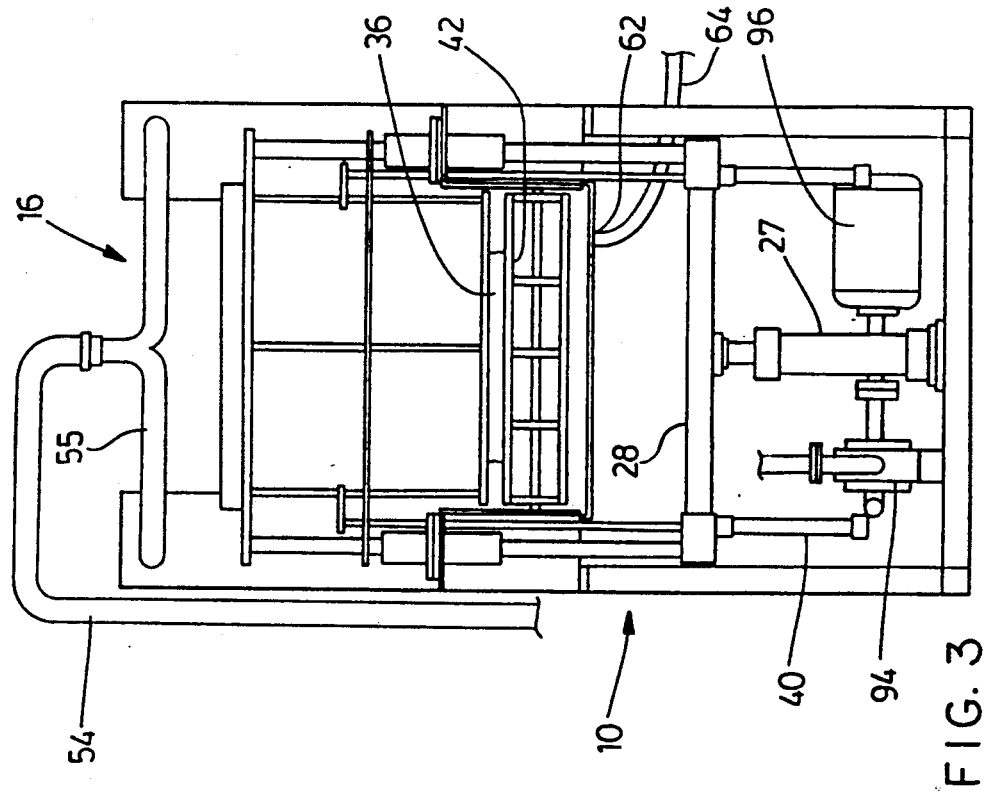
FIG. 3 is a schematic end elevation, of the portion of the apparatus shown in FIG. 2, partially cut away.
Figure 2:
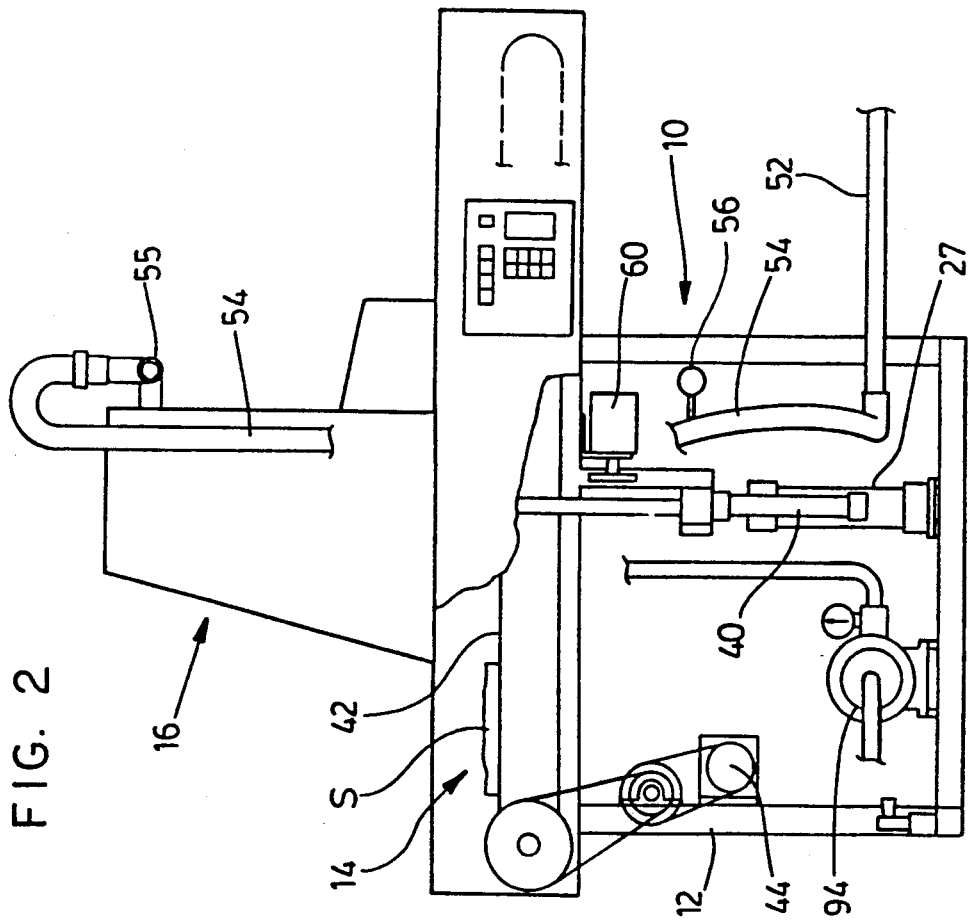
FIG. 2 is a schematic side elevation of a portion of the apparatus of FIG. 1 partially cut away.
Figure 8:
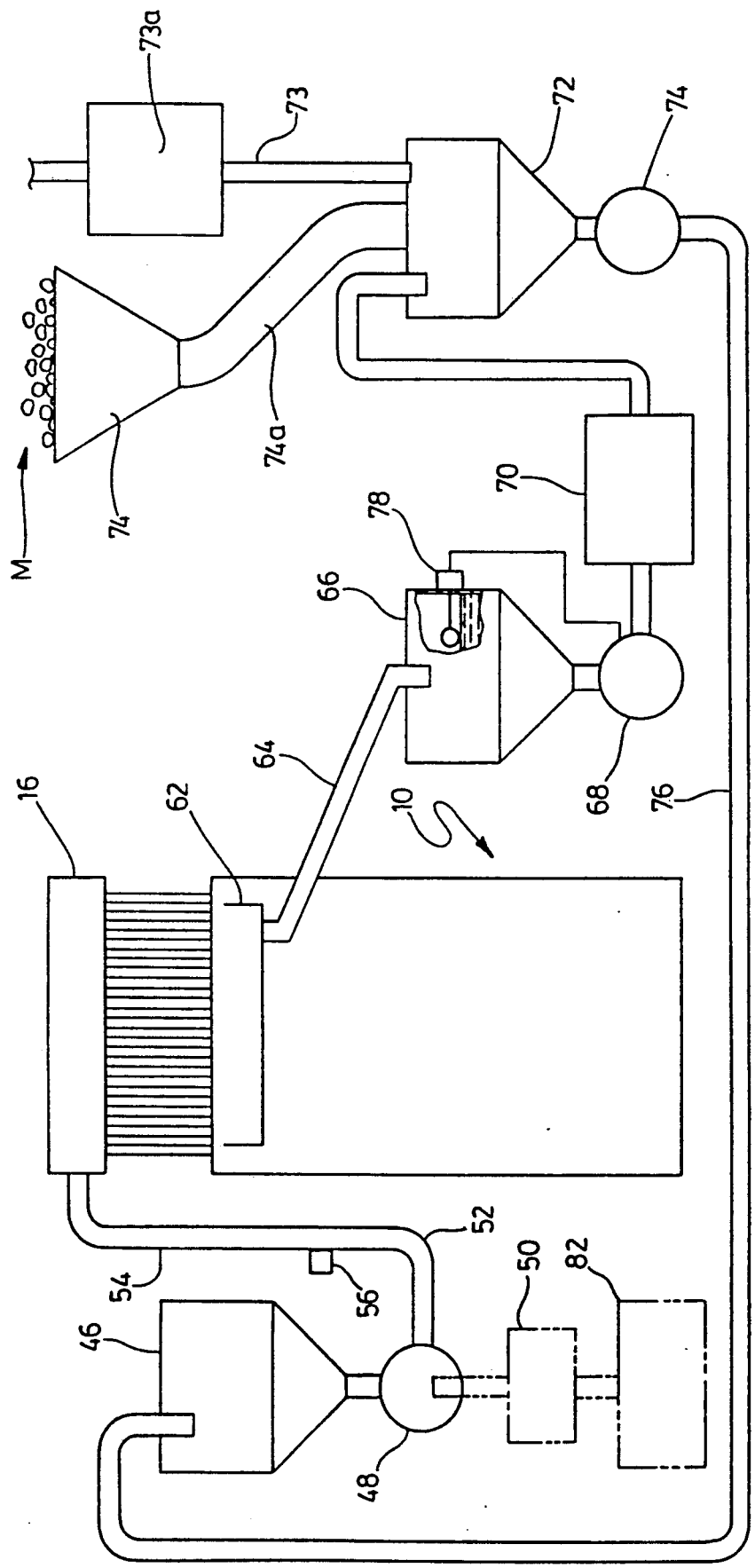

Located beneath the conveyor is a collector tray 62 (FIG. 3), intended to receive and catch any excess suspension which may be exuded from the meat sections or which is ejected by needles which do not register with or do not penetrate a meat section. Tray 62 is connected by a drain conduit 64, to tank 66 (FIG. 8).

Tank 66 is connected to a pump 68, which is adapted to pass the re-cycled suspension through an optional heat exchanger 70, to a tank 72. The tank 72 is also adapted to receive brine and/or pickling liquid, via pipe 73. Typically the brine (and/or pickle) will have been chilled, e.g., in a heat exchanger 73a, typically to a temperature in the region of 18° F. The trim portions of meat M will have been chilled or frozen separately, to in the region of 18° F. in a separate chiller (not shown) and are supplied via hopper 74 and pipe 74a. The tank 72 will thus receive a mixture of fresh un-milled material, and recycled suspension, at a reduced or chilled temperature.

The tank 72 is connected to a cold reduction mill 75, which is operable to process both the fresh material and the recycled suspension, until the meat particles are all reduced to the same size of not more than 2 mm in any direction, forming a suspension in the brine.

From the mill, the suspension is then passed via a conduit 76, to tank 46.

It will, of course, be appreciated that the volume of material draining from the tray 62 to the tank 66 will vary, and thus the operation of the pump 68 will take place at intervals, depending upon the volume of material accumulating in the tank 66. In a typical operation, the pump 68 will be operated intermittently, and may be controlled, for example, by a float level switch 78 (FIG. 8), in tank 66.

During most of the operating time, the tank 72 (and thus tank 46) will be receiving only fresh material.

In this way, excess suspension, which would otherwise be lost at the injection needles, is collected and at intervals, is (optionally cooled), recycled, and is remixed with the fresh chilled meat suspension for resupply to container tank 46.

All of the above operations are controlled by means of a controller 80, containing logic circuits for timing and counting, and issuing signals to the various systems. The various sensors and control devices are indicated generally in the block diagram of FIG. 7 (and also in FIG. 4) and will be seen to comprise a variable speed controller 82 for controlling the speed of motor 50 driving pump 48, and pressure transducer 54. Transducer 56 senses the pressure of the suspension in conduit 54 as delivered by the pump 48, and supplies pressure signals back to the controller 80 which will in turn send control signals to the speed controller 82 and motor 50.

Opening of valves 32 will cause a pressure drop in conduit 54. Motor 50 will then speed up to maintain the desired injection pressure.

Closing of valves 32 will cause a pressure rise. Motor 50 will then slow down to avoid an overpressure in conduit 54.

Control of the operation of the main cylinder 27 is achieved through a main cylinder control board 86 connected to receive control signals from the controller 80. The control board 86 is in turn connected to a main cylinder solenoid control valve 88, controlling the main cylinder 27 in a manner known per se.

The main cylinder 27 is, in turn, connected (through the frame 27) to the encoder 60 (FIG. 4) and the encoder 60 is in turn connected so as to deliver signals to the central controller 80.

In order to control the movement of the conveyor belt 42, the hydraulic motor 44 (FIG. 4) is controlled by means of a belt advance solenoid valve 90, which is in turn connected to receive control signals from the controller 80. Motor 44 is connected to belt advance encoder 58 (FIG. 4) which is in turn connected to deliver signals to the controller 80.

In order to control the stripper plate cylinders 40, a stripper plate solenoid valve 92 is provided, connected to receive signals from the controller 80, and thus control the stripper plate cylinders.

Any suitable source of hydraulic power such as the pump 94 and motor 96 are provided, for supplying hydraulic power for the main cylinder 27, the stripper plate cylinders 40 and the hydraulic motor 44, in a manner known per se.

The operation of the apparatus is self evident from the foregoing description. Meat muscle sections are simply placed on the conveyor belt 42, which will then advance them step wise, so that they will stop and register with the needles. The cylinders 40 and 28 are then operated to operate the stripper plate and the header 29, and the needles will plunge downwardly and upwardly. The pump 48 will operate to force suspension through the needles into the meat sections. As the needles move upwardly and the stripper plate releases the meat sections, the belt will then advance the meat sections a predetermined increment, at which point the belt will stop and the meat sections are again injected, and so on until the appropriate volume of suspension has been injected.

If one or more needles do not pierce a meat section, either because they do not register with one, or because of a piece of bone, then suspension will nevertheless be ejected by those needles, since all valves for all needles open simultaneously.

This has the effect of flushing all needles in each injection cycle and prevents gelling of suspension in some needles. Ejected suspension is recovered and recycled as described.

Throughout the operation, the controller 80 monitors all factors in the operation including the position of the needles, the pressure of the suspension, the movement and position of the belt, and the movement of the needles and the stripper plate in such a way as to optimize the operation of the apparatus.

It will thus be seen that the method in accordance with the invention comprises the steps of moving meat sections along a predetermined processing part in a stepwise start stop fashion, moving a predetermined plurality of injection needles in a direction generally transverse to said meat sections, while stopped, whereby at least some of said needles will penetrate said meat sections; operating injection pumping means to pump a suspension of meat particles as described herein through all of said needles simultaneously, whether the same have penetrated meat sections or not, withdrawing said needles from said meat sections, collecting any excess suspension which has escaped from said meat sections, or which has been discharged by needles which have not penetrated meat sections, passing said collected suspension to collecting tank means, recycling same two set injection pop means, for reinjection through said needles.

After processing, when meat products treated in this way are cut for serving, it is found that the meat presents a smooth homogenous and aesthetically pleasing texture, without the appearance of marks or blemishes caused by the injection process, which were customary in the past.

The foregoing is a description of a preferred embodiment of the invention which is given here by way of example only. The invention is not to be taken as limited to any of the specific features as described, but comprehends all such varations thereof as come within the scope of the appended claims.

WHAT IS CLAIMED IS:

1. Apparatus for the injection into meat sections of a cold milled particle reduction suspension of finely divided meat pieces (less than 2.0 mm in any dimension) in a liquid mixture, and comprising:

container means for receiving a supply of said suspension;

pump means on said container means for pumping said suspension from said container means at a constant pressure of a set point between about 30 and about 90 psi, to header means;

a plurality of injection needles connected to said header means, said injection needles defining axial passageways and axial openings at their free ends and defining points on respective said needles;

support means for supporting at least one said meat section in registration with said injection needles;

movement means for reciprocating said needles towards, into, and away from at least one said meat section on said support means;

smoothly curved conduit means connecting from said header means to said passageways in said needles, and, valve means on said header means for opening and closing all said conduit means simultaneously, said valve means being normally closed prior to insertion, and being all openable simultaneously when at least some of said needles enter said meat section, said pump means being operable to pump said suspension of meat pieces through all said valve means and all said injection needles at said pre-set pressure between about 30 and about 90 psi, and at a temperature of between about 26° F. and 42° F., whether said needles are located in a said meat section or not, and thereby ejecting said suspension from all said needles simultaneously.

2. Apparatus as claimed in claim 1, and further including collector means for collecting excess suspension from around said meat sections, and apparatus for returning same to said container for injection into a further said meat section.

3. Apparatus as claimed in claim 2 including heat exchanger means for chilling said excess suspension to a temperature of between 26° F. and 36° F.

4. Apparatus as claimed in claim 1 and including means for detecting the position of said needles, the depth of injection into said meat sections, the pressure of said suspension during injection, and means for varying the operation of said pump means, and means for detecting the temperature of said suspension, whereby to maintain control over said temperature and pressure of said suspension.

5. Apparatus as claimed in claim 1, and further including conveying said meat section, said conveyer means being variable intermittently in a start stop fashion, whereby to move said meat sections past said needles in predetermined equal increments of movement.

6. Apparatus as claimed in claim 1 including pressure sensing means connected to said pump means, whereby to sense the pressure of suspension before, during and after pumping, and control means variable to control pumping of said suspension whereby to maintain said pressure between said preset pressure range.

7. Apparatus as claimed in claim 2 including collector tank means for collecting suspension from said collector means, and means for sensing the volume of said collected suspension in the said collector tank means, and pump means intermittently variable in response thereto, to pump said contents.

8. Apparatus as claimed in claim 6 and including cold mill particle reduction means for supplying fresh meat trim portions thereto, means for supplying liquid material whereto, and means for supplying said excess suspension from said collector means, whereby the same will remix and mill with said fresh meat trim portions, for resupply to said pump means.

* * * * *